(12) United States Patent
Enzmann et al.

(10) Patent No.: US 9,807,861 B2
(45) Date of Patent: Oct. 31, 2017

(54) PROTECTING A VACUUM ENVIRONMENT FROM LEAKAGE

(71) Applicant: TRUMPF Laser- und Systemtechnik GmbH, Ditzingen (DE)

(72) Inventors: Andreas Enzmann, Villingen-Schwenningen (DE); Bjoern Volz, Ludwigsburg (DE)

(73) Assignee: TRUMPF Laser—und Systemtechnik GmbH, Ditzingen (DE)

(*) Notice: Subject to any disclaimer, the term of this patent is extended or adjusted under 35 U.S.C. 154(b) by 0 days.

(21) Appl. No.: 15/233,438

(22) Filed: Aug. 10, 2016

(65) Prior Publication Data

US 2016/0353561 A1    Dec. 1, 2016

Related U.S. Application Data

(63) Continuation of application No. PCT/EP2014/052798, filed on Feb. 13, 2014.

(51) Int. Cl.
*H05G 2/00* (2006.01)
*G02B 7/00* (2006.01)
*H01S 3/223* (2006.01)

(52) U.S. Cl.
CPC .......... *H05G 2/008* (2013.01); *G02B 7/007* (2013.01); *G02B 7/008* (2013.01); *H05G 2/005* (2013.01); *H01S 3/2232* (2013.01)

(58) Field of Classification Search
CPC combination set(s) only.
See application file for complete search history.

(56) References Cited

U.S. PATENT DOCUMENTS 8,742,379 B2 * 6/2014 Kameda ................. G02B 7/008
                                                                  250/504 R
8,847,182 B2    9/2014 Lambert et al.
(Continued)

FOREIGN PATENT DOCUMENTS

TW          201346440 A      11/2013
WO          WO8804846 A1     6/1988
(Continued)

OTHER PUBLICATIONS

International Search Report from corresponding PCT Application No. PCT/EP2014/052798, dated Oct. 20, 2014, 4 pages.
(Continued)

*Primary Examiner* — David E Smith
*Assistant Examiner* — Hsien Tsai
(74) *Attorney, Agent, or Firm* — Fish & Richardson P.C.

(57) ABSTRACT

Methods, devices, and systems for protecting a vacuum environment from leakage are provided. The devices include an optical component for gas-tight closure of the vacuum environment, a retention device configured to retain the optical component and including a cooling region separated from the vacuum environment in a gas-tight manner and configured to receive a cooling medium to cool the optical component, a first part-region of the optical component being arranged in the cooling region, and a reduced-pressure region configured to have a reduced pressure and separated in a gas-tight manner from the vacuum environment and from the cooling region, a second part-region of the optical component being arranged in the reduced-pressure region, and a detector configured to detect a leakage in the optical component when the cooling medium flows from the cooling region into at least one of the reduced-pressure region or the vacuum environment.

28 Claims, 3 Drawing Sheets

(56) References Cited

U.S. PATENT DOCUMENTS

| | | |
|---|---|---|
| 9,164,388 B2 | 10/2015 | Chilese et al. |
| 2009/0086917 A1 | 4/2009 | Warburton et al. |
| 2010/0195074 A1* | 8/2010 | Sogard .................. F24J 2/4625 355/67 |
| 2011/0140008 A1 | 6/2011 | Bergstedt et al. |

FOREIGN PATENT DOCUMENTS

| | | |
|---|---|---|
| WO | WO2011130327 A1 | 10/2011 |
| WO | WO2012026228 A1 | 3/2012 |

OTHER PUBLICATIONS

Notification of Transmittal of Translation of the International Preliminary Report on Patentability and Written Opinion of the International Searching Authority for corresponding PCT Application No. PCT/EP2014/052798, dated Aug. 25, 2016, 14 pages.

* cited by examiner

PROTECTING A VACUUM ENVIRONMENT FROM LEAKAGE

CROSS-REFERENCE TO RELATED APPLICATIONS

This application is a continuation and claims priority under 35 U.S.C. §120 to PCT Application No. PCT/EP2014/052798, filed on Feb. 13, 2014. The contents of this priority application is incorporated herein by reference in its entirety.

TECHNICAL FIELD

The present invention relates to methods, devices, and systems for protecting a vacuum environment from leakage.

BACKGROUND

Some extreme ultraviolet (EUV) radiation production devices have a vacuum chamber in which a target material can be introduced to produce EUV radiation. A beam guiding chamber serves to guide a laser beam from a laser source into the vacuum chamber. Between the vacuum chamber and the beam guiding chamber an intermediate chamber is provided. A first window that closes the intermediate chamber in a gas-tight manner serves to introduce the laser beam from the beam guiding chamber into the intermediate chamber. A second window that closes the intermediate chamber in a gas-tight manner serves to discharge the laser beam from the intermediate chamber into the vacuum chamber.

The vacuum chamber is separated from the environment in a sealing manner by the second window. If the second window is destroyed or the seal of the second window is faulty, gas from the environment can flow into the vacuum chamber since in the vacuum chamber there is a lower pressure than in the environment, for example, in the beam guide. The second window or the seal thereof consequently constitute potential sources of leakage. Owing to a non-tight window, it is possible not only for gas, but also where applicable for fluid materials, for example, cooling water for cooling the window, to reach the vacuum environment. In some cases, the primary sealing of the vacuum chamber by the second window is supplemented with a secondary sealing by the first window so that, in the event of damage to or breakage of the second window, only the (small) gas volume present in the intermediate chamber can reach the vacuum environment.

In some systems, a device has an optical component having a non-planar surface which includes an optically active region. A flow guide is formed on the non-planar surface to orientate a gas in order at least in a part-region of the optically active region of the non-planar surface of the optical component to produce a turbulent flow to cool the optical component. The optical component may, for example, be a convex lens which serves to introduce a laser beam into the vacuum chamber of an EUV radiation production device and which focuses the laser beam in a target region within the vacuum chamber.

SUMMARY

One aspect of the invention features a device of protecting a vacuum environment from leakage, including: an optical component for the gas-tight closure of the vacuum environment, a cooling device for cooling the optical component by supplying a fluid or gaseous cooling medium to a cooling region which is separated from the vacuum environment in a gas-tight manner and in which a first part-region of the optical component is arranged, a vacuum production device for producing a reduced pressure in a reduced-pressure region which is separated in a gas-tight manner from the vacuum environment and from the cooling region and in which a second part-region of the optical component is arranged, and a detection device for detecting a leakage in the optical component when the cooling medium flows from the cooling region into the reduced-pressure region and/or into the vacuum environment.

A closure of the vacuum environment by the optical component in the context of this application is intended to be understood to mean that the optical component separates the vacuum environment that can be formed in a vacuum chamber from a surrounding space in a gas-tight manner which may be located, for example, in another chamber and in which there is a higher pressure than in the vacuum chamber. The surrounding space can be separated in a gas-tight manner both from the reduced-pressure region and from the cooling region. The cooling region can have an inlet opening for the cooling medium and an outlet opening for the cooling medium, that is to say, there is an exchange of the cooling medium.

In the event of a defect in the optical component, for example, the formation of a crack, the fluid or gaseous cooling medium from the cooling region can reach the reduced-pressure region via the crack or defect in the optical component, that is to say, the first and second part-regions of the optical component are no longer separated from each other in a gas-tight manner. The reduced pressure is a pressure which is lower than atmospheric pressure under normal conditions. The reduced-pressure region forms a separate vacuum, that is to say, the reduced-pressure region is not connected to the vacuum chamber or to the vacuum environment. In the reduced-pressure region, the cooling medium may be discharged or drawn away so that the cooling medium does not reach the vacuum environment. If a flow of the cooling medium from the cooling region into the reduced-pressure region and/or into the vacuum environment is detected, counter-measures can be taken which prevent the cooling medium or relatively large amounts of the cooling medium from being introduced into the vacuum environment. The second part-region of the optical component, which is arranged in the reduced-pressure region, can be located at the side of the optical component facing away from the vacuum environment.

In an embodiment, the device is constructed, in the event of a leakage in the optical component, to block a supply line for supplying the cooling medium to the cooling region. In this manner, it is possible to prevent additional cooling medium from flowing via the inlet opening into the cooling region, which could otherwise reach the vacuum environment. The blocking of the supply line may, for example, be carried out via a switchable valve, for example, a directional valve which is switched by the detection device into an appropriate switching position.

In another embodiment, the device is constructed, in the event of a leakage in the optical component to supply a typically gaseous flushing medium to the cooling region. Owing to the flushing of the cooling region using a medium which is inert with respect to the components which are arranged in the vacuum environment, typically a cooling gas, in particular a noble gas, for example, argon or optionally hydrogen, directly after the detection of the leakage, the cooling medium can be removed from the cooling region so that the optical components which are located in the vacuum environment are protected from contamination or damage by the cooling medium. The flushing with the flushing medium can be carried out under pressure to flush out the cooling medium, e.g., in the most rapid manner possible. Of course, the flushing with the flushing medium can be carried out in a time-limited manner and until the cooling medium has been completely removed from the cooling region.

In a development, the device is adapted to supply the flushing medium to the cooling region via an outlet opening or an inlet opening for the cooling medium. A flushing of the cooling region using the counter-flow principle, that is to say, counter to the flow direction of the cooling medium, has been found to be advantageous, but the flushing medium can also be supplied to the cooling region via the inlet opening for the cooling medium or optionally via another opening.

In a development, the device has a switchable valve for selectively connecting the outlet opening to a supply line for the flushing gas or to a discharge line for the cooling medium. The valve may in this instance be switched from a first switching position (for cooling operation), in which the discharge line for the cooling medium is connected to the outlet opening, into a second switching position, in which the supply line is connected to the outlet opening (for flushing operation). The switching from cooling operation to flushing operation is carried out when the detection device detects a leakage in the optical component. Alternatively, a switchable valve may be provided to selectively produce a connection of an inlet opening of the cooling region for the cooling medium to a supply line for the cooling medium or to a supply line for the flushing medium to switch between cooling operation and flushing operation.

In another embodiment, the device is adapted to produce a fluid connection between the cooling region and the reduced-pressure production device to draw the flushing medium from the cooling region. In this manner, the flushing medium may be drawn from the cooling region in a particularly effective manner. In particular, residual molecules which have remained in the line system after the flushing operation can also be drawn away by the reduced-pressure production device.

In another development, the device has a switchable valve for selectively connecting an inlet opening of the cooling region to a supply line for the cooling medium or to a connection line for connection to the reduced-pressure production device. The switchable valve may optionally be produced in a structural unit with the switchable valve described above. The switchable valve may in particular be resiliently loaded, that is to say, it has in the state with no power applied a defined valve position or switching position. The switching position in the state without any electrical power is typically used for cooling operation. In this case, the switchable valve is only acted on with electric current and electrically switched into the switching position for flushing operation when a leakage is detected.

Alternatively, the device may have a switchable valve for selectively connecting the outlet opening of the cooling region to a discharge line for the cooling medium or to a connection line for connection to the reduced-pressure production device. Such a valve may also be resiliently loaded, the switching position of the valve in the state with no electrical power applied typically being used for cooling operation.

In some embodiments, the detection device has a pressure sensor for determining a (reduced) pressure produced by the reduced-pressure production device and/or a pressure sensor for determining a pressure in the vacuum environment. The pressure sensor is constructed to measure a pressure or a temporal pressure change, in particular a pressure increase, which is present in the reduced-pressure region or in a line formed between the reduced-pressure production device and the reduced-pressure region or an inlet opening of the reduced-pressure region or in the vacuum environment.

In a development, the detection device is constructed, when a pressure threshold value of the reduced pressure and/or the pressure in the vacuum environment is exceeded or when a threshold value of a pressure increase of the reduced pressure and/or the pressure in the vacuum environment is exceeded, to detect a flow of the cooling medium from the cooling region into the reduced-pressure region. As a result of the flow of the cooling medium, the pressure detected by the pressure sensor typically increases. If the pressure detected by the pressure sensor or the pressure increase, that is to say, the pressure change per time unit (gradient), is above a threshold value, this is indicated to the detection device or optionally to a control device, which takes the corresponding steps to switch the device from cooling operation to flushing operation (see above).

In another embodiment, the detection device has a residual gas analyzer for detecting the cooling medium in the vacuum environment. The residual gas analyzer has a mass spectrometer to analyze the residual gas atmosphere in the vacuum environment or in the vacuum chamber in a qualitative and quantitative manner. The detection of molecules of the cooling medium, for example, water molecules, may indicate that cooling medium has flowed into the vacuum environment.

In a development, the residual gas analyzer is constructed, when a threshold value for the partial pressure of the cooling medium in the vacuum environment is exceeded or when a threshold value of an increase of the partial pressure of the cooling medium in the vacuum environment is exceeded, to detect a flow of the cooling medium from the cooling region into the vacuum environment. The residual gas analyzer can produce a mass spectrum, based on which the number of molecules of materials contained in the vacuum environment, more specifically the number of molecules of a mass-to-charge ratio characteristic of the respective material, can be determined. The number of molecules of a respective material is typically proportional to the partial pressure of this material in the vacuum environment and can therefore be used to determine whether the cooling medium has flowed into the vacuum environment. As long as a small proportion of a material which is identical to the cooling medium, for example, water vapor, is in any case present in the vacuum environment, that is to say, without the presence of a leakage, it may be advantageous to detect the presence of a leakage with reference to a threshold value of the increase of the partial pressure being exceeded (that is to say, the change of the partial pressure per time unit).

In another embodiment, the device further includes a retention device for retaining the optical component, in which the cooling region and the reduced-pressure region are formed. The retention device may in particular be a holder in which the optical component is inserted. Both the first part-region and the second part-region may be constructed in the form of hollow spaces in the retention device or in the holder which are separated from each other in a gas-tight manner by the optical component inserted into the retention device and optionally by way of additional seals. Both the first and the second part-region are typically located in the portion of the optical component received by the holder, that is to say, outside an optically used part-region of the optical component.

In another embodiment, the device further includes at least one seal for separating the cooling region from the reduced-pressure region in a gas-tight manner. The at least one seal is arranged between the cooling region and the reduced-pressure region and serves to close any gap which may be present between the optical component and the retention device in a gas-tight manner so that the cooling medium cannot reach the reduced-pressure region from the cooling region when the optical component is intact. The seal may be constructed, for example, as an O-ring, a molded seal, etcetera. The device or the holder may have at least one additional seal which is arranged between the reduced-pressure region and the optically used part-region of the optical component and which serves to separate the reduced-pressure region from the vacuum environment or from the space surrounding the optical component in a gas-tight manner.

In another embodiment, the reduced-pressure production device is constructed as a Venturi nozzle. In a Venturi nozzle, the reduced pressure is produced in a removal pipe which is typically arranged at the narrowest location of a pipe through which a pressure medium, typically a fluid, for example, water, flows. At the narrowest location of the pipe, the static pressure is minimal so that in the removal pipe there is a reduced pressure which can be used to draw a fluid or gaseous medium and which in this instance is used to draw the cooling medium or the flushing medium. Of course, it is optionally also possible to use other reduced-pressure production devices to produce a reduced pressure in the reduced-pressure region, for example, suction pumps or the like.

In another embodiment, the optical component has an optically used part-region and the first part-region is further away from the optically used part-region than the second part-region. This is advantageous since, in the event of a formation of a crack in the optical component, the cooling medium first reaches the second part-region before reaching the optically used part-region and can be drawn off by the reduced-pressure production device. The second part-region may in particular be constructed in an annular manner so that any cooling water discharged from the cooling region can reach the second part-region regardless of the type of crack formed.

In another embodiment, the optical component is constructed as a plane-parallel plate or window, that is to say, the optical component has no beam-shaping function. As described further above, a laser beam can enter the vacuum environment through such a window. Owing to the high level of thermal conductivity thereof, (synthetically produced) diamond is often used as a material for such a window, in particular when the device is used in an EUV radiation production device having high laser powers (>1 kW). The production costs for such a window of diamond material are comparatively high so that the thickness of such a window is generally selected so as not to be too large. When a window is used with a comparatively large thickness, insufficient cooling may further result in destruction of the diamond material (burnout).

Another aspect of the invention features an EUV radiation production device including: a vacuum chamber having a vacuum environment in which a target material can be arranged to produce EUV radiation, and a device as described above. The optical component serves in this instance to separate the vacuum environment in the vacuum chamber from another chamber, for example, a beam guiding chamber, in a gas-tight manner, or an intermediate chamber. The beam guiding chamber serves to guide a laser beam from a beam source, which may have, for example, one or more $CO_2$ lasers, into the vacuum chamber. The laser beam is focused in a target region which is located in the vacuum chamber and on which the target material is arranged.

A further aspect of the invention features a method of protecting a vacuum environment from a leakage in an optical component that closes the vacuum environment in a gas-tight manner. The method includes the steps of: supplying a cooling medium to a cooling region which is separated from the vacuum environment in a gas-tight manner and in which a first part-region of the optical component is arranged, producing a reduced pressure in a reduced-pressure region which is separated from the vacuum environment and from the cooling region in a gas-tight manner and in which a second part-region of the optical component is arranged, and detecting a leakage in the optical component when the cooling medium flows from the cooling region into the reduced-pressure region. As has been described above, the flow can be detected, for example, with reference to an increase of the pressure in the reduced-pressure region or in lines which are connected thereto.

In a variant, after the detection of the leakage, the supply of the cooling medium to the cooling region is prevented to prevent introduction of the cooling medium via the optical component into the vacuum environment.

In another variant, after the detection of the leakage, a flushing medium is supplied to the cooling region. The flushing medium is typically inert with respect to the optical components arranged in the vacuum environment, that is to say, it does not lead to damage or contamination of these components.

In a development, a fluid connection is produced between the cooling region and a reduced-pressure production device to draw off the flushing medium from the cooling region. Using the reduced-pressure production device, it is also possible to draw off residual molecules which have remained in the line system after the flushing operation. The flushed-out cooling medium or flushing medium can be collected.

Other advantages of the invention will be appreciated from the description and the drawings. The features which have been mentioned above and those which are set out in greater detail below can also be used individually or together in any combination. The embodiments which are shown and described are not intended to be understood to be a definitive listing, but instead are of exemplary character in order to describe the invention.

DETAILED DESCRIPTION

Figure 1:
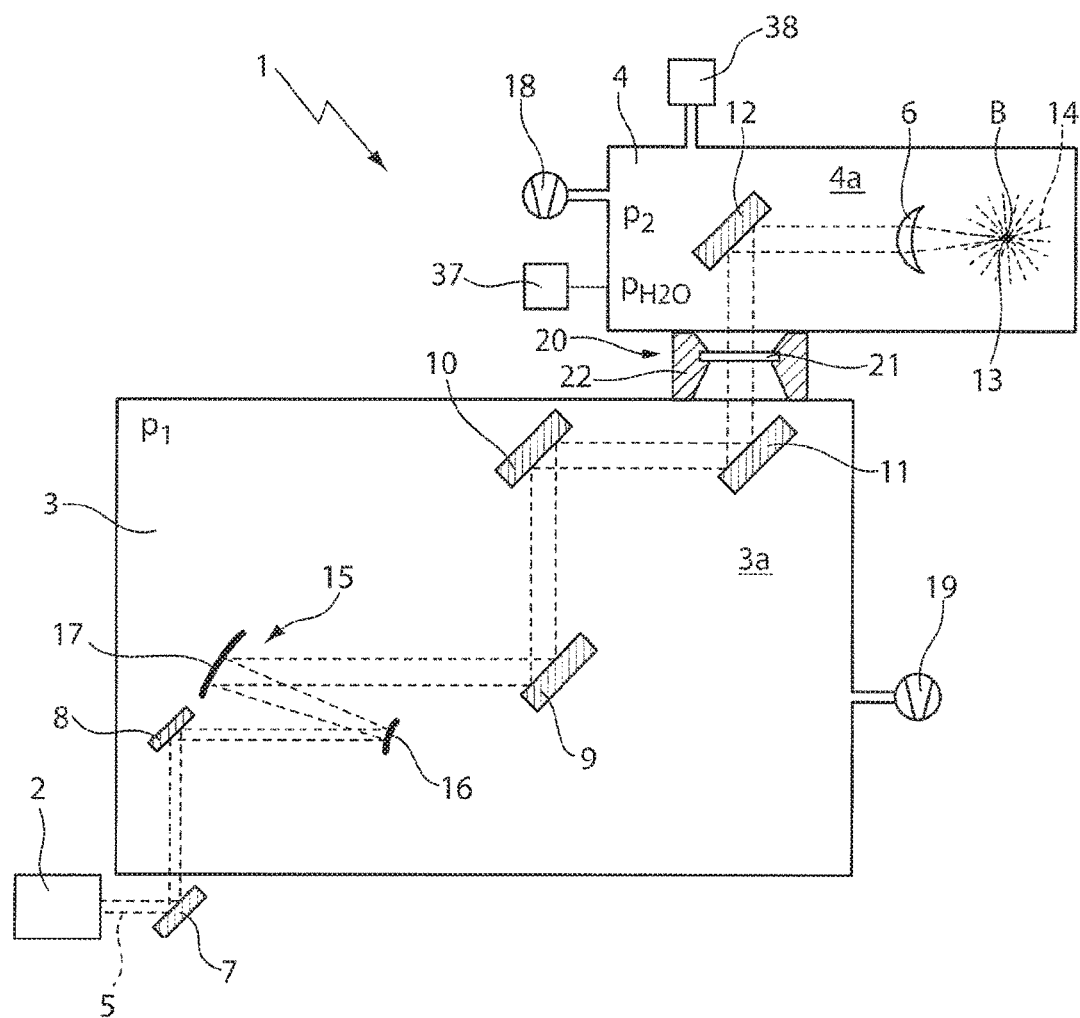
FIG. 1 is a schematic illustration of an example EUV radiation production device that has a beam guiding chamber, a vacuum chamber and an optical component for the gas-tight separation of the two chambers.

In the following description of the drawings, identical reference numerals are used for components which are the same or which have the same function.

FIG. 1 shows an example EUV radiation production device 1 which has a driver laser device 2, a beam guiding chamber 3 and a vacuum chamber 4. In a vacuum environment 4a which is formed in the vacuum chamber 4, a focusing device in the form of a focusing lens 6 is arranged to focus a $CO_2$ laser beam 5 in a target region B. The EUV radiation production device 1 shown in FIG. 1 substantially corresponds to the structure as described in US 2011/0140008 A1, the subject matter of which is incorporated in this application by reference in its entirety. The illustration of measuring devices for monitoring the beam path of the laser beam 5 has been omitted for reasons of clarity.

The driver laser device 2 includes a $CO_2$ beam source and a plurality of amplifiers to produce a laser beam 5 with a high beam power (>1 kW). For a detailed description of examples of possible embodiments of the driver laser device 2, reference may be made to US 2011/0140008 A1. From the driver laser device 2, the laser beam 5 is redirected via a plurality of redirection mirrors 7 to 11 of the beam guiding chamber 3 and another redirection mirror 12 in the vacuum chamber 4 onto the focusing lens 6 which focuses the laser beam 5 in the target region B on which tin is arranged as a target material 13.

The target material 13 is hit by the focused laser beam 5 and in this instance converted into a plasma state, which serves to produce EUV radiation 14. The target material 13 is supplied to the target region B using a preparation device (not shown) which guides the target material 13 along a predetermined path which intersects with the target region B. For details of the provision of the target material, reference may also be made to US 2011/0140008 A1.

In a beam guiding space 3a of the beam guiding chamber 3, there is provided a device 15 for enlarging a beam diameter of the laser beam 5 which has a first off-axis parabolic mirror 16 having a first convex-curved reflecting surface and a second off-axis parabolic mirror 17 having a second concave-curved reflecting surface. The reflecting surfaces of an off-axis parabolic mirror 16, 17 each form the off-axis segments of an (elliptical) paraboloid. The term "off-axis" means that the reflecting surfaces do not contain the rotation axis of the paraboloid (and consequently also not the apex of the paraboloid).

A vacuum pump 18 serves to produce in the vacuum chamber 4 an operating pressure $p_2$ which is in the fine vacuum range (generally substantially lower than 1.0 mbar). The operation of the vacuum chamber 4 under reduced-pressure conditions is required, since, in a residual gas environment with an excessively high pressure, there would be excessive absorption of the EUV radiation 14 produced. In contrast, the beam guiding chamber 3 or the inner space 3a which is formed therein is operated at a substantially higher pressure $p_1$, which may be, for example, in the order of magnitude of approximately 5 mbar above atmospheric pressure (e.g., 1013 mbar). The beam guiding chamber 3 is consequently placed under an excess pressure with respect to the environment of the EUV radiation production device 1 in a targeted manner in order to protect the optical elements which are arranged in the beam guiding chamber 3 from contamination.

FIG. 1 also shows a device 20 for protecting the vacuum environment 4a in the vacuum chamber 4 from leakage in an optical component 21 in the form of a planar plate or a window which serves to close the vacuum environment 4a in a gas-tight manner, i.e., to separate the vacuum chamber 4 and the beam guiding chamber 3 as a gas-tight sealing. The window 21 is integrated in a holder 22. Through the window 21, the laser beam 5 can enter the vacuum environment 4a.

The material of the window 21, in this instance (synthetically produced) diamond, becomes powerfully heated as a result of the high radiation power of the laser beam 5.

Figure 2A:
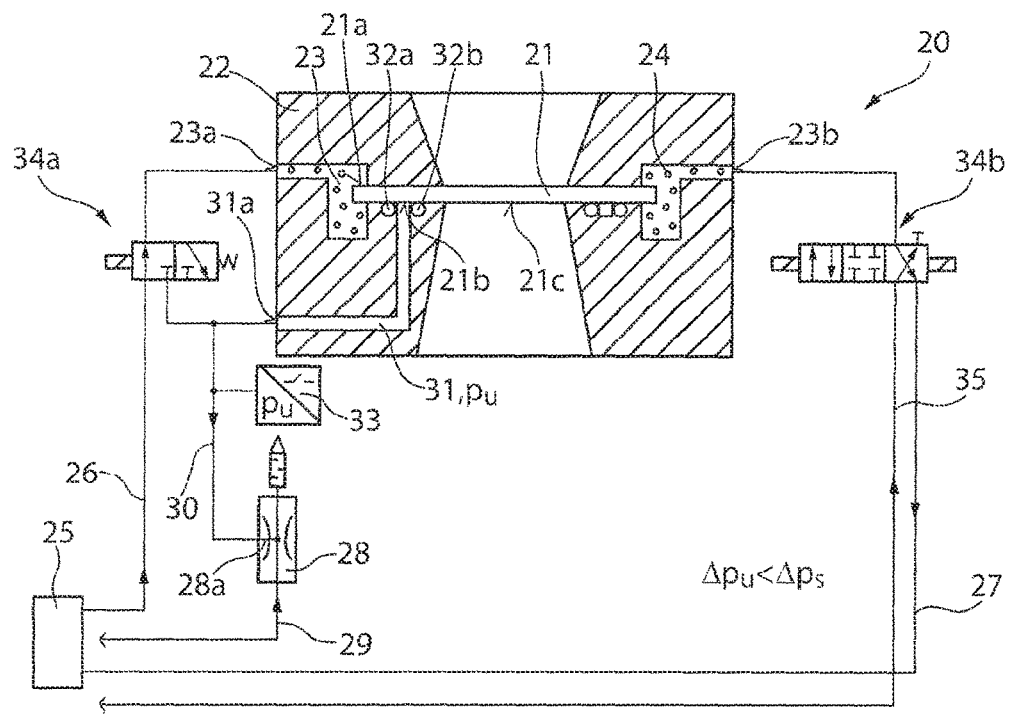
FIG. 2A is an illustration of an example device for protection of a vacuum environment formed in a vacuum chamber from a leakage of an optical component during cooling operation.

As can be seen in FIG. 2A, the holder 22 has a hollow space which forms a cooling region 23 and to which a cooling medium 24, for example, in the form of cooling water, can be supplied via an inlet opening 23a. As can also be seen in FIG. 2A, a first part-region 21a of the surface of the window 21 is arranged in the cooling region 23 and comes into contact with the cooling medium 24. The cooling region 23 forms a substantially annular hollow space and has at a side diametrically opposed to the inlet opening 23a an outlet opening 23b to discharge the cooling medium 24. The supply of the cooling medium 24 is carried out in the example shown in FIG. 2A via a supply line 26 which extends from a cooling device (cooling unit or cooler) 25. The heated cooling medium 24 which is discharged at the outlet opening 23b of the cooling region 23 is supplied via a discharge line 27 to the cooling device 25 which discharges the heat absorbed by the cooling medium 24 to the environment or to another medium. The cooling device 25, the supply line 26 and the discharge line 27 form a closed cooling circuit for the cooling medium 24. Of course, this is not necessarily the case, that is to say, the heated cooling medium 24 may, for example, when cooling water is used—be discharged to the environment.

The device 20 further has a reduced-pressure production device (or a reduced-pressure generator) in the form of a Venturi nozzle 28. The Venturi nozzle 28 is supplied via a supply line 29 with a fluid pressure medium which is taken from a reservoir which is not shown. The Venturi nozzle 28 has a removal pipe 28a in which the pressure medium flowing through the Venturi nozzle 28 produces a reduced pressure. The removal pipe 28a is connected by means of a connection line 30 to a reduced-pressure region 31 which is formed in the holder 22 of the window 21 and which is constructed in the example shown as a hollow space. The reduced-pressure region 31 is constructed in the manner of a circular ring in the region of the window 21 so that a second annular part-region 21b of the window 21, more specifically of the surface thereof, is located in the reduced-pressure region 31 and is acted on with a reduced pressure $p_u$ which may, for example, be only slightly below atmospheric pressure (e.g., 1013 mbar). To separate the reduced-pressure region 31 from the cooling region 23, a first seal 32a in the form of an O-ring is fitted in the holder 22.

In order to separate the reduced-pressure region 31 from the beam guiding chamber 3, a second seal 32b in the form of another O-ring is fitted in the holder 22.

Figure 2B:
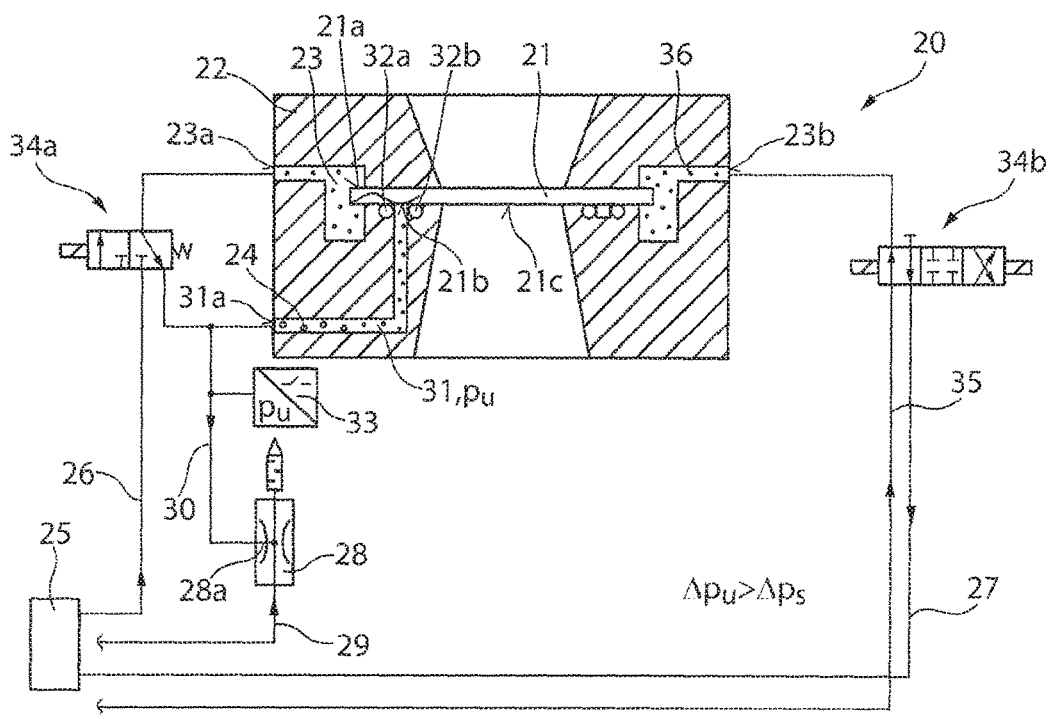
FIG. 2B is an illustration of the device from FIG. 2A during flushing operation.

The reduced pressure $p_u$ in the reduced-pressure region 31 is monitored by means of a detection device (e.g., a detector) which is constructed in the example shown as a pressure sensor 33. The pressure sensor 33 is used, in the event of a predetermined threshold value $p_s$ of the reduced pressure $p_u$ being exceeded ($p_u > p_s$) or in the event of a predetermined threshold value $\Delta p_s$ of an increase $\Delta p_u$ of the pressure $p_u$ (per time unit) being exceeded, to detect a flow of the cooling medium 24 from the cooling region 23 into the reduced-pressure region 31, which flow may occur in the event of damage, for example, in the event of the formation of a crack, in the window 21. Fig. When the threshold value $\Delta p_s$ of the pressure increase $\Delta p_u$ is exceeded, the device 20 switches from cooling operation which is illustrated in FIG. 2A (e.g., $\Delta p_u < \Delta p_s$) to flushing operation which is illustrated in FIG. 2B (e.g., $\Delta p_u > \Delta p_s$).

Alternatively or in addition to detecting the flow of the cooling medium 24 from the cooling region 23 into the reduced-pressure region 31, a detection of the flow of the cooling medium 24 into the vacuum environment 4a may also be carried out. This is possible, for example, using a pressure sensor 37 (cf. FIG. 1) which is connected to the vacuum environment 4a and which serves to determine the operating pressure $p_2$ in the vacuum chamber 4. If the operating pressure $p_2$ in the vacuum chamber 4 is above a pressure threshold value $p_{2,s}$, a flow of the cooling medium 24 into the vacuum environment 4a is detected and the device 20 is switched from cooling operation to flushing operation. Alternatively or in addition, when a threshold value $\Delta p_{2,s}$ for the pressure increase $\Delta p_2$ of the operating pressure $p_2$ in the vacuum environment 4a is exceeded, the device 20 can also be switched from cooling operation to flushing operation.

Additionally or alternatively, a residual gas analyzer 38 which is illustrated in FIG. 1 can also be used as a detection device. The residual gas analyzer 38 is constructed for analysis of the residual gas atmosphere present in the vacuum environment 4a and enables quantitative determination of the partial pressure or the number of molecules of the gaseous materials contained in the residual gas atmosphere. In this instance, the residual gas analyzer 38 serves to determine the partial pressure $p_{H2O}$ of the cooling medium 24 in the form of cooling water, more specifically of water vapor, in the residual gas atmosphere or in the vacuum environment 4a.

If the partial pressure $p_{H2O}$ of the cooling medium 24 is above a threshold value $p_{H2O,s}$, the device 20 is switched from cooling operation to flushing operation. Alternatively or additionally, when a threshold value $p_{H2O,s}$ for the pressure increase $\Delta p_{H2O}$ of the partial pressure $p_{H2O}$ of the cooling medium 24 in the vacuum environment 4a is exceeded, the device 20 can also be switched from cooling operation into flushing operation. The latter (i.e., using the comparison of the pressure increase $\Delta P_{H2O}$ with a threshold value $\Delta p_{H2O,s}$) is particularly advantageous when, without the flow of the cooling medium 24 from the cooling region 23, a small quantity of the cooling medium 24 is already present in the vacuum environment 4a. Typically, in the vacuum environment 4a, a small quantity of water vapor is present so that, when water is used as a cooling medium 24, the detection of the leakage using the comparison of the pressure increase $\Delta p_{H2O}$ with a threshold value $\Delta p_{H2O,s}$ may where applicable be more favorable than the detection using the comparison of the partial pressure $p_{H2O}$ with a threshold value $P_{H2O,s}$.

In order to switch the device 20 from cooling operation to flushing operation, the pressure sensor 33, the additional pressure sensor 37 and/or the residual gas analyzer 38 act(s) directly or optionally via a control device on two switchable valves 34a, 34b. The control device can be implemented as a suitable software and/or hardware, e.g., a microcontroller, an application-specific integrated circuit (ASIC), and/or a field programmable gate array (FPGA). In this instance, the first valve 34a, which is constructed as a directional valve having two switching positions, is switched from a first switching position, which is shown in FIG. 2A and in which the supply line 26 for the cooling medium 24 is connected to the inlet opening 23a of the cooling region 23, into a second switching position, which is shown in FIG. 2B and in which the connection between the supply line 26 and the inlet opening 23a is separated, and the inlet opening 23a is instead connected to the connection line 30 between the intake pipe 28a of the Venturi nozzle 28 and the reduced-pressure region 31. At the same time, the second valve 34b is also switched from a third switching position (cf. FIG. 2A) into a first switching position (cf. FIG. 2B) in which the discharge line 27 for the cooling medium 24 is separated from the outlet opening 23b. In this manner, the cooling device 25 or the cooling circuit 25, 26, 27 is completely separated from the optical component 21.

In the first switching position of the second valve 34b as shown in FIG. 2B, a supply line 35 for a flushing medium 36 is simultaneously connected to the outlet opening 23b of the cooling region 23. The flushing medium 36 is an inert gas, for example, argon, or optionally hydrogen. The flushing medium 36 is taken from a reservoir which is not illustrated graphically and in which the flushing medium 36 is kept under pressure. The flushing medium 36 which is introduced into the cooling region 23 via the outlet opening 23b urges the cooling medium 24 which is discharged from the cooling region 23 through the inlet opening 23a. The inlet opening 23a, in the second switching position of the first valve 34a as shown in FIG. 2B, is connected to the connection line 30 and consequently the Venturi nozzle 28 via which the cooling medium 24 and also the flushing medium 36 is drawn off. The drawn-off cooling medium 24 and also the drawn-off flushing medium 36 reach the Venturi nozzle 28 via the removal pipe 28a, are carried by the pressurized fluid flowing in the Venturi nozzle 28 and may optionally be collected. Using the Venturi nozzle 28, it is also possible to draw off residual molecules of the cooling medium 24 which still remain in the line portions between the inlet opening 23a of the cooling region 23 or between an inlet opening 31a of the reduced-pressure region 31 and the Venturi nozzle 28.

If the flushing operation is completed, the device 20 can be switched into a rest mode, in which the second valve 34b assumes a second switching position thereof (and/or in which the first valve 34a keeps at the second switching position thereof), in which the outlet opening 23b is completely blocked so that no more flushing medium 36 reaches the cooling region 23 and the reduced-pressure region 31. In addition, the supply line 29 of the Venturi nozzle 28 can be blocked so that the Venturi nozzle 28 no longer produces reduced pressure $p_u$. In the rest mode produced in this manner, the damaged window 21 can be removed from the holder 22 and be replaced by a new window.

The new window closes the reduced-pressure region 31 in a gas-tight manner with respect to the cooling region 23, that is, the new window tightly seals the reduced-pressure region 31 from the cooling region 23, so that the device 20 can be operated in cooling operation again. The switching of the second valve 34b into the second switching position can be carried out automatically after a predetermined period of time which is optionally predetermined by a time-delay member or a time-delay circuit. Of course, the switching of the valves 34a, 34b does not necessarily have to be carried out by the detection device or the pressure sensor 33, but there may optionally be provided in the device 20 an additional control device to which the measurement signal supplied by the pressure sensor 33 is transmitted and which, depending on the reduced pressure $p_u$ measured carries out the switching of the valves 34a, 34b or the switching between cooling operation, flushing operation and rest mode. Of course, in place of two controllable valves 34a, 34b, only a single controllable valve may be provided in the device 20. In the example shown, the first controllable valve 34a is resiliently loaded so that the first controllable valve 34a assumes the first switching position (i.e., cooling operation of the device 20) shown in FIG. 2a without a voltage being applied or without being acted on with electric current.

Figure 3A:
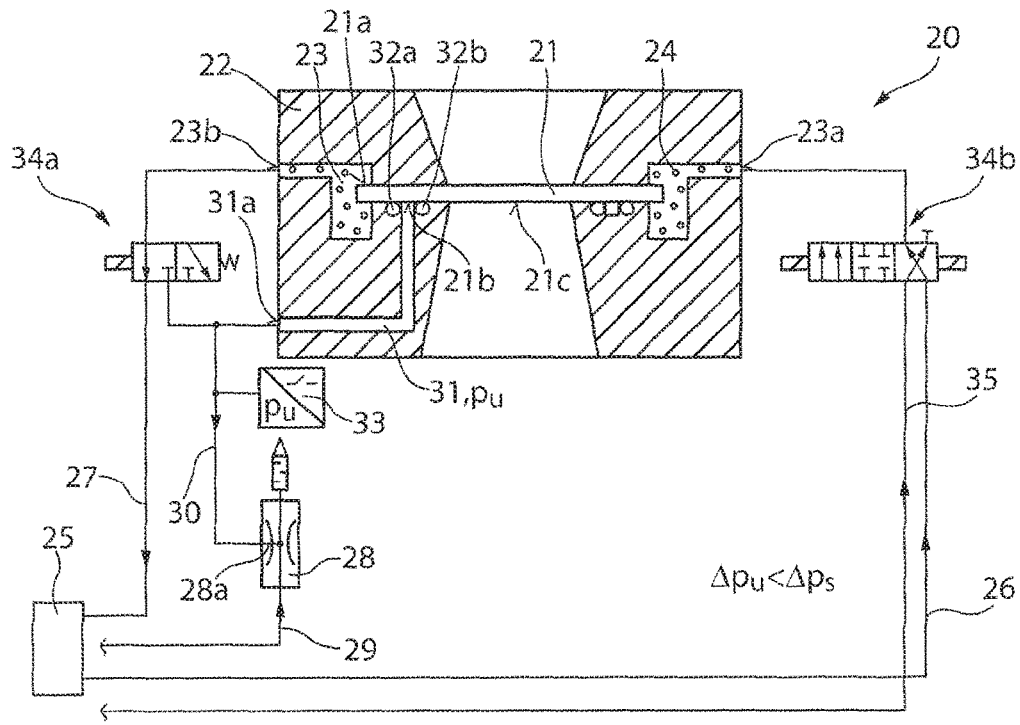
FIGS. 3A and 3B are illustrations similar to FIGS. 2A and 2B with a reversed flow direction of a cooling medium in comparison with FIGS. 2A and 2B, respectively.
Figure 3B:
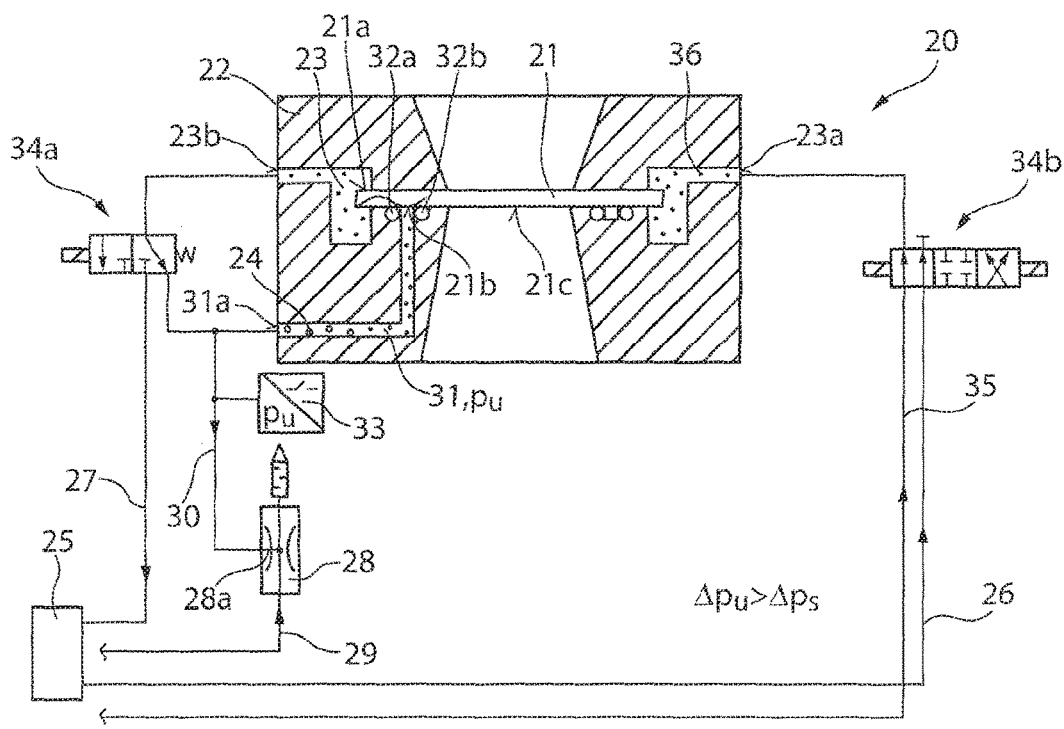

FIGS. 3A and 3B show an embodiment in which the flow direction of the cooling medium 25 is reversed in the cooling circuit 25, 26, 27 with respect to the embodiment shown in FIGS. 2A and 2B. Accordingly, the function of the inlet opening 23a and the outlet opening 23b is transposed. The second valve 34b is therefore constructed for the selective connection of the inlet opening 23a to the supply line 26 for the cooling medium 24 or to the supply line 35 for the flushing medium 36. Accordingly, the first switchable valve 34a is constructed for selectively connecting an outlet opening 23b of the cooling region 23 to a discharge line 27 for the cooling medium 24 or to a connection line 30 for connection to the reduced-pressure production device 28. Optionally, the supply and discharge of the flushing medium 36 may be carried out not via the inlet opening 23a or the outlet opening 23b (or vice versa), but instead via additional openings.

In summary, it is possible to produce in the manner described above effective protection of a vacuum environment 4a from the introduction of a cooling medium 24 in the event of a leakage in an optical component 21, which closes the vacuum environment 4a in a gas-tight manner. Of course, the optical component does not necessarily have to be constructed as a window 21 but may optionally also be constructed as a lens or in another manner. The optical component 21 also does not necessarily serve to separate the vacuum chamber 4 from the beam guiding chamber 3 as shown in FIG. 1, since, between the vacuum chamber 4 and the beam guiding chamber 3, an intermediate chamber (not shown) may optionally be arranged.

A number of embodiments of the invention have been described. Nevertheless, it will be understood that various modifications may be made without departing from the spirit and scope of the invention. Accordingly, other embodiments are within the scope of the following claims.

What is claimed is:

1. A device for protecting a vacuum environment from leakage, comprising:
    an optical component configured to close the vacuum environment in a gas-tight manner;
    a retention device configured to retain the optical component and comprising:
        a cooling region separated from the vacuum environment in a gas-tight manner and configured to receive a cooling medium to cool the optical component, a first part-region of the optical component being arranged in the cooling region; and
        a reduced-pressure region configured to have a reduced pressure and separated in a gas-tight manner from the vacuum environment and from the cooling region, a second part-region of the optical component being arranged in the reduced-pressure region; and
    a detector configured to detect a leakage in the optical component when the cooling medium flows from the cooling region into at least one of the reduced-pressure region or the vacuum environment.

2. The device of claim 1, further comprising a cooling device configured to supply the cooling medium to the cooling region in the retention device.

3. The device of claim 1, further comprising a reduced-pressure production device configured to produce the reduced pressure in the reduced-pressure region in the retention device.

4. The device of claim 3, wherein the reduced-pressure production device comprises a Venturi nozzle.

5. The device of claim 1, configured to, in an event of a leakage in the optical component, block a supply line from supplying the cooling medium to the cooling region.

6. The device of claim 5, further comprising a switchable valve configured to selectively connect to a connection line for connection to a reduced-pressure production device that produces the reduced pressure in the reduced-pressure region in the retention device, such that the supply line is blocked from supplying the cooling medium to the cooling region.

7. The device of claim 5, configured to, in the event of the leakage in the optical component, supply a flushing medium to the cooling region.

8. The device of claim 7, configured to supply the flushing medium to the cooling region via an outlet opening for the cooling medium or via an inlet opening for the cooling medium.

9. The device of claim 8, further comprising a switchable valve configured to selectively connect the outlet opening to
    a supply line for the flushing medium or
    a discharge line for the cooling medium.

10. The device of claim 9, wherein the switchable valve is configured to selectively connect the outlet opening to the supply line for the flushing medium, such that the flushing medium is supplied to the cooling region.

11. The device of claim 7, further comprising a switchable valve configured to selectively connect the inlet opening to
    a supply line for the cooling medium or
    a supply line for the flushing medium.

12. The device of claim 7, further comprising a connection line to produce a fluid connection between the cooling region and a reduced-pressure production device to draw the flushing medium from the cooling region, the reduced-pressure production device being configured to produce the reduced pressure in the reduced-pressure region.

13. The device of claim 12, further comprising a switchable valve configured to selectively connect an inlet opening of the cooling region to
    a supply line for the cooling medium or
    the connection line for connection to the reduced-pressure production device.

14. The device of claim 13, further comprising a switchable valve configured to selectively connect an outlet opening of the cooling region to
    a discharge line for the cooling medium or
    the connection line for connection to the reduced-pressure production device.

15. The device of claim 1, wherein the detector comprises a pressure sensor configured to determine the reduced pressure in the reduced pressure region.

16. The device of claim 15, wherein the detector is configured to detect a flow of the cooling medium from the cooling region into the reduced-pressure region at an occurrence of
    the determined reduced pressure exceeding a threshold value for the reduced pressure, or
    a pressure increase of the determined reduced pressure exceeding a threshold value for the pressure increase of the reduced pressure.

17. The device of claim 1, wherein the detector comprises a pressure sensor configured to determine a pressure in the vacuum environment.

18. The device of claim 17, wherein the detector is configured to detect a flow of the cooling medium from the cooling region into the vacuum environment at an occurrence of the determined pressure in the vacuum environment exceeding a threshold value for the pressure in the vacuum environment, or a pressure increase of the determined pressure in the vacuum environment exceeding a threshold value for the pressure increase of the pressure in the vacuum environment.

19. The device of claim 1, wherein the detector comprises a residual gas analyzer configured to detect a partial pressure of the cooling medium in the vacuum environment.

20. The device of claim 19, wherein the residual gas analyzer is configured to detect a flow of the cooling medium from the cooling region into the vacuum environment at an occurrence of the detected partial pressure exceeding a threshold value for the partial pressure of the cooling medium in the vacuum environment, or an increase of the detected partial pressure exceeding a threshold value for the increase of the partial pressure of the cooling medium in the vacuum environment.

21. The device of claim 1, further comprising at least one seal configured to separate the cooling region from the reduced-pressure region in a gas-tight manner.

22. The device of claim 1, wherein the optical component comprises an optically used part-region, and wherein the first part-region is further away from the optically used part-region than the second part-region.

23. The device of claim 1, wherein the optical component is constructed as a plane-parallel plate.

24. A method of protecting a vacuum environment from leakage, comprising:

supplying a cooling medium to a cooling region separated from the vacuum environment in a gas-tight manner, a first part-region of an optical component being arranged in the cooling region, the optical component closing the vacuum environment in a gas-tight manner;

producing a reduced pressure in a reduced-pressure region separated from the vacuum environment and from the cooling region in a gas-tight manner, a second part-region of the optical component being arranged in the reduced-pressure region; and detecting a leakage in the optical component when the cooling medium flows from the cooling region into at least one of the reduced-pressure region or the vacuum environment.

25. The method of claim 24, further comprising:
in response to the detection of the leakage, preventing the supply of the cooling medium to the cooling region.

26. The method of claim 24, further comprising:
in response to the detection of the leakage, supplying a flushing medium to the cooling region.

27. The method of claim 25, further comprising:
producing a fluid connection between the cooling region and a reduced-pressure production device to draw off the flushing medium from the cooling region, the reduced-pressure production device being configured to produce the reduced pressure in the reduced-pressure region.

28. An extreme ultraviolet (EUV) radiation production device comprising:

a vacuum chamber having a vacuum environment where a target material is arranged to produce EUV radiation when a laser beam is incident on the target material; and a device configured and arranged to protect the vacuum environment from leakage, the device comprising:

an optical component configured for gas-tight closure of the vacuum environment, wherein the laser beam propagates into the vacuum environment through the optical component;

a retention device configured to retain the optical component and comprising:

a cooling region separated from the vacuum environment in a gas-tight manner and configured to receive a cooling medium to cool the optical component, a first part-region of the optical component being arranged in the cooling region; and a reduced-pressure region configured to have a reduced pressure and separated in a gas-tight manner from the vacuum environment and from the cooling region, a second part-region of the optical component being arranged in the reduced-pressure region; and a detector configured to detect a leakage in the optical component when the cooling medium flows from the cooling region into at least one of the reduced-pressure region or the vacuum environment.

* * * * *